United States Patent Office 3,137,702
Patented June 16, 1964

3,137,702
PREPARATION OF BIS-QUATERNARY
PYRIDINIUM SALTS
Arthur Lüttringhaus and Ilse Hagedorn, Freiburg, Breisgan, Hermann Engelhard, Goettingen, and Norbert Engelhard, Freiburg, Breisgan, Germany, assignors to E. Merck, Darmstadt, Germany
No Drawing. Filed Aug. 11, 1961, Ser. No. 132,265
Claims priority, application Germany Aug. 13, 1960
4 Claims. (Cl. 260—296)

This invention relates to the preparation of novel pyridinium salts which, in particular, are potent reactivators for inhibited acetylcholinesterase.

It is well known that the so-called military "nerve gases," as well as many of the more prosaic insecticides, are comprised of organophosphorous compounds such as diisopropylphosphofluoridate (DEP), and tetraethylpyrophosphate (TEPP). These compounds are potent toxic agents because of their inhibitory effect on certain fundamental enzymes, particularly acetylcholinesterase which under normal conditions catalyzes the necessary hydrolysis of nervous tissue.

Due not only to the military aspects of these enzyme inhibitors, but due also to the fact that these organophosphorous compounds are being sold in abundant quantities to both the farmer and the home gardener, it is necessary to provide an effective antidote for these inhibitors, as a matter of public health. Whereas certain antidotes have been suggested, such as pyridine-2-aldoxime-methiodide ("PAM"), I. B. Wilson and F. Sondheimer, Archives of Biochemistry and Biophysics, vol. 69, p. 468 (1957), and trimethylene-1-3-bis-(4-formylpyridiniumbromide)-dioxime ("TMB4"), E. J. Poziomek, B. E. Hackley, Jr., and G. M. Steinberg, Journal of Organic Chemistry, vol. 23, p. 714 (1958), nevertheless these compounds have not been accepted as the ultimate antidotes.

The object of this invention, therefore, is to provide novel and highly potent antidotes which can reactivate acetylcholinesterase which has been inhibited by organophosphorous poisons.

Another object of the invention is to provide novel intermediates which can be utilized to prepare more sophisticated compounds in an attempt to discover even more efficacious reactivators for inhibited acetylcholinesterase.

Still a further object of this invention is to provide a novel process for preparation of the novel compounds herein disclosed.

Upon further study of the specification and appended claims, other objects and advantages of this invention will become apparent.

To attain the objects of this invention, it has been discovered that at least about a 3-fold increase in reactivation power can be obtained by bis-quaternary pyridinium salts of the following formula—

(I)
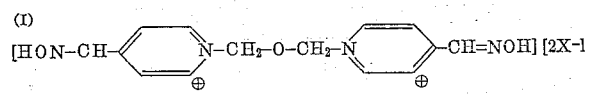

wherein X is an equivalent of a monovalent or polyvalent anion.

In brief, the novel compounds of this invention are prepared by reacting pyridine-4-aldoxime with a bis-substituted ether of the following formula (II)     $Y-CH_2-O-CH_2-Y$ wherein Y is a halogen atom, preferably a chlorine or bromine atom. The substituent Y of the methylether appears as anion X in the obtained pyridinium salts. Subsequently, the halogen anion X can be exchanged, if desired, for other anions by conventional techniques such as ion exchange or metathesis or reaction with acids or other salts.

The reaction of the ether and the pyridine-4-aldoxime is preferably conducted in a solvent in which both reactants are soluble. Of course innumerable solvents are available for this purpose, and they can be selected from either literature data, or by a simple test. Among the possible solvents, it is preferred to employ aliphatic alcohols having from 1 to 5 carbon atoms, hydrocarbons such as benzene, or hydrocarbon derivatives such as chloroform, dichloromethane, and dimethyl formamide.

Any concentration of the reactants in the chosen solvent can be employed as long as the reactants are, in fact, in solution. Of course, it is desirable, from the standpoint of economics, to employ higher concentration of the reactants rather than lower concentrations.

The ratio of the reactants can also be varied, a stoichiometric ratio being satisfactory.

As a preferred technique for conducting the reaction, it is advantageous to form a first solution of the pyridine-4-aldoxime, and then to pass a second solution of the substituted methyl ether into the first solution. By this technique, the formation of mono-derivatives is avoided, and the pure reaction product is obtained directly in very high yields.

In general, the reaction can be conducted at from 0–120° C., preferably 20–80° C. For the sake of convenience, it is desirable to employ an operating temperature equal to the boiling point of the reaction medium, so that reflux conditions can be observed without the necessity of superatmospheric pressures. However, if it is desired, higher than reflux temperature can be employed by providing pressure vessels and associated equipment.

With respect to the time necessary for the completion of the reaction, it of course is dependent on the nature of the substituted-methyl ether and also on the operating temperature, but in general about 30 minutes are required for the completion of the reaction. After the reaction is completed, it is convenient to continue the agitation of the reaction mixture for about 10 minutes in order to improve the physical properties, such as filterability, of the precipitated product. The precipitate is then filtered and washed with absolute acetone to remove impurities. The mother liquor, if desired, can be reused as a reaction media to additional products.

With respect to the product, Formula I, it is preferred that X is a halide (bromide, fluoride, iodide and chloride), and particularly a chloride ion. Other preferred anions are also anions of relatively strong acids such as for example, the perchlorate anion. In general, however, the anion merely has to meet the requirement of being capable of forming a salt with the quaternary pyridinium base. An example of a multivalent anion is, for example, the succinate anion.

In order to obtain the preferred anions in the products of this invention, there can be employed as the bis-substituted methyl ethers, dihalogendimethyl ethers, such as the α,α'-dichloro- and the α,α'-dibromo-dimethyl ether. In addition, once the product is formed, the halogen anion can be exchanged with other anions by conventional methods. For example, if X is a chloride ion, it can be treated with perchloric acid to form the corresponding bis-perchlorate salt, or it can be treated with the silver salt of succinic acid to obtain the succinate.

The novel pyridinium salts of this invention are crystalline and water-soluble. They are capable of reactivating the enzyme acetylcholinesterase which has been previously inhibited by organophosphorous pesticides or chemical warfare agents. This reactivation effect is considerably higher (almost 3-fold) than prior art substances having reactivation capabilities. For example, the following table compares the effectiveness (antidote effect) of PAM (pyridine-2-aldoxime-methiodide) and TMB4 [trimethylene-1,3 - bis - (4-formylpyridiniumbromide)-dioxime] versus Formula I wherein X represents a chloride ion [bis-(4-hydroxy-iminomethylpyridinium - (1) - methyl)-ether dichloride].

TABLE 1

| Compound | Michaelis-Menten constants |
| --- | --- |
| PAM | $1.1 \cdot 10^{-5}$ |
| TMB4 | $1 \cdot 10^{-6}$ |
| Formula I (chloride) | $3.1 \cdot 10^{-7}$ |

The "Michaelis-Menten" constants represent the equilibrium in the system enzyme:substrate. The lower the value of the constants, the greater is the reactivation of the enzyme by the reactivator.

The pharmacological investigations were conducted according to the methods described by Hobbiger in Brit. J. Pharmacol., vol. 12, p. 438 (1957), by Bülbring in Brit. J. Pharmacol., vol. 1, p. 38 (1946), and by Bethe et al. in Arch. Exper. Path. Pharmakol., vol. 231, p. 3 (1957). The duration of the activity of the new compounds was tested according to the method described by Kewitz et al. in Arch. Biochem., vol. 64, p. 456 (1957).

Furthermore, the new compound bis - [4 - hydroxy-iminomethyl-pyridinium-(1)-methyl]-ether dichloride was found to be very effective as an antidote in O,O-diethyl-O - para - nitrophenyl - thiophosphate intoxication. The therapeutic dose administered twice intravenously in a poisoned subject was 250 mg. The injection instantaneously restored normal blood esterase activity. No side effects were noted.

The new compounds of this invention can be processed into all the conventional forms of pharmaceutical preparations. It is possible, for example, to incorporate the compounds into pills, tablets (sugar coated and otherwise), solutions, emulsions, syrups and solutions for intravenous injections.

To illustrate the invention in even greater detail, the following preferred specific embodiments of the process of this invention are submitted. It is to be understood, however, that the examples are not to be construed as limitative of the specification or appended claims in any way whatsoever.

Example 1

BIS-[4-HYDROXYIMINO-METHYL-PYRIDINIUM-(1)-METHYL]-ETHER-DICHLORIDE

Into a boiling agitated solution of 2.44 g. pyridine-4-aldoxime in 10 cc. absolute ethanol is added dropwise during the course of 25 minutes a solution of 1.14 g. bis-chloromethyl ether in 5 cc. absolute ethanol. The reaction mixture is then refluxed for 35 minutes, and then agitated for 5 hours at room temperature. The precipitate of bis-[4 - hydroxyimino-methyl-pyridinium-(1)-methyl]-ether-dichloride is thoroughly washed with absolute acetone. The yield is 3.5 g. which is 98% of the theoretical, and the melting point is 229° C. If convenient, the mother liquor can be reused to make additional product.

Example 2

BIS-[4-HYDROXYIMINO-METHYL-PYRIDINIUM-(1)-METHYL]-ETHER-DICHLORIDE 12.2 g. (0.1 mole) pyridine-4-aldoxime are dissolved with heating in 125 cc. chloroform. Within 25 minutes, 8.5 g. (0.075 mole) α,α'-dichloro-dimethyl-ether in 20 cc. chloroform are dropped while stirring into the boiling solution. The reaction mixture is heated for another 35 minutes. After standing for several hours, the precipitate is filtered off, washed with absolute ethanol, acetone and ether and dried at 80°. Yield: 17 g.=95% of the theoretical, and the melting point is 225° (with decomposition).

Example 3

BIS-[4-HYDROXYIMINO-METHYL-PYRIDINIUM-(1)-METHYL]-ETHER-DIBROMIDE 12.2 g. (0.1 mole) pyridine-4-aldoxime are dissolved in 200 cc. boiling methylene chloride. To the cooled solution there are added dropwise with stirring 15 g. (0.075 mole) α,α'-dibromo-methyl-ether in 20 cc. methylene chloride. The precipitate is filtered off, washed thoroughly with ethanol, acetone or ether, and dried. Yield: 20.2 g.=90% of the theoretical and the melting point is 202° (with decomposition).

Example 4

BIS-[4-HYDROXYIMINO-METHYL-PYRIDINIUM-(1)-METHYL]-ETHER-SUCCINATE 3.59 g. (0.01 mole) of the bis-[4-hydroxyimino-methyl-pyridinium-(1)-methyl]-ether-dichloride obtained according to Example 2 are dissolved in 70 cc. hot methanol (90%). With stirring, 3.30 g. (0.01 mole) silver succinate are added. The reaction mixture is heated for 5 minutes, then the precipitate is filtered off. Upon addition of ether the succinate crystallizes with 5 moles of water. Yield: 3.16 g.=64% of the theoretical. Melting point 167° (with decomposition). Upon drying in vacuo a yellow mono-hydrate is obtained which regenerates the colorless pentahydrate when stored at the air.

Example 5

BIS-[4-HYDROXYIMINO-METHYL-PYRIDINIUM-(1)-METHYL]-ETHER-DIPERCHLORATE 2.8 cc. perchloric acid (70%) are added with cooling to a solution of 3.6 g. of the dichloride obtained according to Example 2 in 110 cc. ethanol (75%). After standing for 3 hours, 3.8 g. (=78% of the theoretical) of the diperchlorate are crystallized. Melting point 205° (with decomposition).

From the foregoing description, one skilled in the art can readily appreciate the essential characteristics of this invention, and without departing from the spirit and scope of essential characteristics, one can modify and adapt this invention to various usages and conditions. Such modifications and adaptations of this invention should, and are intended to be within the full range of equivalence of the following claims.

What is claimed is:

1. Pharmaceutically acceptable, non-toxic, crystalline, water-soluble bis-quaternary pyridinium salts conforming to the following structural formula—

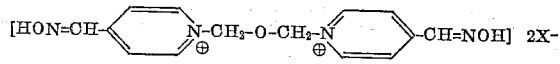

wherein X represents one equivalent of an anion.

2. The salts of claim 1 wherein X is selected from the group of anions consisting of halide, perchlorate, and succinate.

3. The salts of claim 1 wherein X is a chloride anion.

4. The salts of claim 1 wherein X is a bromide anion.

References Cited in the file of this patent

UNITED STATES PATENTS

| | | |
| --- | --- | --- |
| 2,292,479 | Reynolds et al. | Aug. 11, 1942 |
| 2,632,761 | Cheney | Mar. 24, 1953 |
| 2,678,316 | Harris | May 11, 1954 |
| 2,769,749 | Thompson et al. | Nov. 6, 1956 |
| 2,909,525 | Fand | Oct. 20, 1959 |
| 2,952,586 | Okunuki et al. | Sept. 13, 1960 |
| 2,997,425 | Singher et al. | Aug. 22, 1961 |
| 3,054,792 | Hackley et al. | Sept. 18, 1962 |
| 3,054,798 | Hackley et al. | Sept. 18, 1962 |
| 3,054,799 | Hackley et al. | Sept. 18, 1962 |
| 3,077,476 | Hackley et al. | Feb. 12, 1963 |